US011775912B2

(12) United States Patent
Murphy et al.

(10) Patent No.: US 11,775,912 B2
(45) Date of Patent: Oct. 3, 2023

(54) SYSTEMS AND METHODS FOR REAL-TIME LEAD GRADING

(71) Applicant: LEADSCORZ INC., Seattle, WA (US)

(72) Inventors: Bernard Patrick Murphy, Seattle, WA (US); Santiago Diez-Perez, León (ES)

(73) Assignee: LEADSCORZ INC., Seattle, WA (US)

( * ) Notice: Subject to any disclaimer, the term of this patent is extended or adjusted under 35 U.S.C. 154(b) by 6 days.

(21) Appl. No.: 17/646,654

(22) Filed: Dec. 30, 2021

(65) Prior Publication Data

US 2022/0207456 A1 Jun. 30, 2022

Related U.S. Application Data

(60) Provisional application No. 63/132,702, filed on Dec. 31, 2020.

(51) Int. Cl.
*G06Q 10/0639* (2023.01)

(52) U.S. Cl.
CPC .............................. *G06Q 10/06393* (2013.01)

(58) Field of Classification Search
CPC ................. G06Q 310/06393; G06Q 10/06393
See application file for complete search history.

(56) References Cited

U.S. PATENT DOCUMENTS

| 8,311,863 | B1 * | 11/2012 | Kemp | G06Q 10/0639 |
| | | | | 705/7.29 |
| 11,295,328 | B2 * | 4/2022 | Avinash Dorle | G06Q 30/0204 |
| 2011/0276388 | A1 * | 11/2011 | Deng | G06Q 30/0241 |
| | | | | 705/14.41 |
| 2014/0075336 | A1 * | 3/2014 | Curtis | H04L 41/22 |
| | | | | 715/753 |
| 2014/0149339 | A1 * | 5/2014 | Title | G06F 16/9535 |
| | | | | 707/609 |
| 2015/0088604 | A1 * | 3/2015 | van der Laan | G06Q 30/0201 |
| | | | | 705/7.29 |
| 2016/0071117 | A1 * | 3/2016 | Duncan | G06Q 30/0201 |
| | | | | 705/7.29 |
| 2016/0328721 | A1 * | 11/2016 | Kulpa | G06Q 30/0201 |
| 2019/0122252 | A1 * | 4/2019 | Cetintas | G06N 3/08 |

(Continued)

FOREIGN PATENT DOCUMENTS

JP        2019164648 A   * 9/2019

OTHER PUBLICATIONS

Fuhriman "Using Cluster Analysis to Identify and Convert" (2015)(https://blog.adobe.com/en/publish/2015/03/04/using-cluster-analysis-identify-convert) (Year: 2015).*

*Primary Examiner* — Sujay Koneru

(74) *Attorney, Agent, or Firm* — McCoy Russell LLP

(57) ABSTRACT

A method for a lead grading platform can include, receiving a lead from a lead vendor, wherein the lead comprises a plurality of lead attribute values, converting the plurality of lead attribute values to a plurality of benchmark values, assigning the lead to a pre-determined cluster and a pre-determined sub-cluster based on the plurality of benchmark values, determining a grade for the lead based on the pre-determined cluster and the pre-determined sub-cluster, and responding to the grade being greater than a threshold grade by: delivering the lead to a lead consumer. In this way, a conversion rate of leads delivered to a lead consumer may be greater than an overall conversion rate of an unfiltered population of leads.

5 Claims, 6 Drawing Sheets

(56) References Cited

U.S. PATENT DOCUMENTS

| | | | |
|---|---|---|---|
| 2019/0272551 A1* | 9/2019 | Shariff | G06Q 30/0261 |
| 2019/0362317 A1* | 11/2019 | Rogynskyy | G06F 16/2272 |
| 2020/0110764 A1* | 4/2020 | Pollak | G06F 18/23213 |
| 2020/0311768 A1* | 10/2020 | Desai | G06Q 30/0255 |
| 2021/0256435 A1* | 8/2021 | Palmer | G06Q 30/0201 |

\* cited by examiner

400

Baseline stats

| Grade | Subgrade | Boost | Freq. |
|---|---|---|---|
| A | | 3.27 | 7.73% |
| | plus | 3.61 | 38.93% |
| | avg | 3.05 | 61.07% |
| B | | 2.16 | 12.58% |
| | plus | 2.47 | 43.55% |
| | avg | 1.91 | 56.45% |
| C | | 1.19 | 18.90% |
| | plus | 1.41 | 48.88% |
| | avg | 0.99 | 51.12% |
| D | | 0.46 | 60.79% |
| | plus | 0.65 | 21.07% |
| | avg | 0.4 | 78.93% |

FIG. 4

Current stats

| Grade | Subgrade | Boost | Freq. | Count | Convs. |
|---|---|---|---|---|---|
| A | | 2.77 | 15.85% | 44314 | 2475 |
| | plus | 2.78 | 57.38% | 25428 | 1425 |
| | avg | 2.76 | 42.62% | 18886 | 1050 |
| | minus | 0 | 0.00% | 0 | 0 |
| B | | 1.93 | 12.12% | 33864 | 1317 |
| | plus | 2.28 | 48.94% | 16572 | 763 |
| | avg | 1.59 | 51.06% | 17292 | 554 |
| | minus | 0 | 0.00% | 0 | 0 |
| C | | 0.76 | 17.42% | 48681 | 742 |
| | plus | 0.97 | 44.97% | 21894 | 427 |
| | avg | 0.58 | 55.03% | 26787 | 315 |
| | minus | 0 | 0.00% | 0 | 0 |
| D | | 0.36 | 54.61% | 152638 | 1104 |
| | plus | 0.51 | 24.28% | 37059 | 381 |
| | avg | 0.31 | 75.72% | 115579 | 723 |
| | minus | 0 | 0.00% | 0 | 0 |

FIG. 5

| Total Leads | Delivered | Scored Leads | Web Leads | Delivered Web Leads | Duplicates |
|---|---|---|---|---|---|
| 407547 | 310952 | 279965 | 35382 | 28953 | 33186 |
| Conversions | Conversion Rate | Avg. Conversion Time | Leaked | Leaked Conv. | Leaked Conv. Rate |
| 6405 | 2.06% | 3d 18h 14m | 616 | 3 | 0.49% |
| Filtered/Invalid | Warm Transfers | Filtered | Rejection Rate | Avg Score Conv. | Avg Score Non-Conv. |
| 34787 | 66158 | 5043 | 1.24% | 79.16 | 61.48 |

FIG. 6

SYSTEMS AND METHODS FOR REAL-TIME LEAD GRADING

CROSS REFERENCE TO RELATED APPLICATIONS

The present application claims priority to U.S. provisional Application No. 63/132,702, entitled "SYSTEMS AND METHODS FOR REAL-TIME LEAD SCORING", filed on Dec. 31, 2020. The entire contents of the above-listed application are hereby incorporated by reference for all purposes.

TECHNICAL FIELD

This disclosure is generally directed to systems and methods for analyzing leads in real time and classifying them in "grades" based on their relative quality with respect to the broader population of acquired leads.

BACKGROUND

Many businesses use leads (also referred to as sales leads) to obtain new customers. However, these businesses have limited resources at their disposal for use in their marketing efforts. Therefore, it is generally desired to distinguish leads with a lower probability to convert, e.g., to become a customer or fulfil another targeted conversion criterion, from leads with a higher probability to convert, thereby enabling businesses to focus their marketing efforts on more promising leads. In conventional approaches, manual evaluation of leads is performed using a set of established heuristics. In one example, the BANT approach comprises determining the quality of a lead based on the Budget of the lead, an Authority of the lead to make a purchase, the Need of the lead for the product/service, and a Timescale of the lead to make a purchase. However, conventional approaches such as the BANT approach are time consuming and rely on subjective assessments of a lead to determine lead quality. Further, conventional lead grading methods suffer from a lack of scalability, as analysis of a greater number of leads requires a proportional increase in the number of human evaluators.

Thus, there remains a need for improved systems and methods for lead quality assessments, which are automatic, objective, and scalable, and which do not rely on manual human evaluation.

SUMMARY

The inventors herein have developed systems and methods which at least partially address the above identified issues. In one example, a method for a lead grading platform comprises, receiving a lead from a lead vendor, wherein the lead comprises a plurality of lead attribute values, converting the plurality of lead attribute values to a plurality of benchmark values, assigning the lead to a pre-determined cluster and a pre-determined sub-cluster based on the plurality of benchmark values, determining a grade for the lead based on the pre-determined cluster and the pre-determined sub-cluster, and responding to the grade being greater than a threshold grade by, delivering the lead to a lead consumer. By "grading" a newly acquired lead (e.g., the lead provided by the lead vendor) based on an assignment of the lead to a previously determined cluster and sub-cluster of historical leads, historical lead data for a lead consumer may be leveraged to enable automatic prediction of a newly acquired lead's probability of converting, that is, of achieving a targeted conversion event. In other words, newly acquired leads may be assigned to clusters of historical leads based on the aggregate of the incoming lead's attributes (aka, the lead's "persona"). Further, by delivering newly acquired leads which surpass a threshold grade, the lead consumer may be automatically presented with leads satisfying one or more previously established quality criteria, enabling the lead consumer to focus resources on leads with an above threshold probability of converting.

The clusters and sub-clusters referred to above may be automatically identified using historical lead data from a lead consumer by, receiving historical lead data, wherein the historical lead data comprises a plurality of leads and a plurality of conversion event records for the plurality of leads, wherein each lead of the plurality of leads comprises a plurality of lead attribute values, converting the plurality of lead attribute values of each of the plurality of leads into a corresponding plurality of benchmark values based on the plurality of conversion event records, encoding the plurality of leads into a plurality of lead vectors, clustering the plurality of lead vectors to form a plurality of clusters, and determining a plurality of cluster labels for the plurality of clusters based on the plurality of conversion event records. The plurality of lead attribute values may include supplemental or inferred values, which may be acquired from third party sources, or may be inferred or interpolated based on other lead attribute values, thereby bolstering a number of data points pertaining to a lead. The cluster labels may comprise a grade, or rank, corresponding to an average or expected conversion probability determined for each cluster based on the plurality of conversion event records. In this way, an initial plurality of clusters may be identified from historical lead data of a lead consumer, which may be used to automatically and accurately infer a grade, rank, or conversion probability of newly acquired leads.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 illustrates an example of a user interface visually displaying a lead consumer's baseline model stats in accordance with certain implementations of the disclosed technology;

FIG. 5 illustrates an example of a user interface visually displaying dynamic stats for the lead consumer of FIG. 4 in accordance with certain implementations of the disclosed technology; and FIG. 6 illustrates an example of a user interface visually displaying the impact of filtering lower quality leads in accordance with certain implementations of the disclosed technology.

DETAILED DESCRIPTION

The current disclosure is generally directed to systems and methods for automatically analyzing leads in real time and classifying them in "grades" based on their quality relative to the broader population of acquired leads, with respect to a target conversion event. These classified grades may range from an "A+" (i.e., highest grade, most likely to achieve the target conversion event) to an "G–" (i.e., lowest grade, least likely to achieve the target conversion event) but can be modified to accommodate other scales if needed or desired by a particular business, such as "1, 2, 3," "Low, Med, High," and "Poor, better, best," for example. As used herein, a grade or ranking refers to a relative expected or historical likelihood of a lead achieving a target conversion event. In other words, a same lead may receive a first grade with respect to a first conversion event, but may receive a second grade, for a second conversion event, wherein the first grade and the second grade are not equivalent, and wherein the first conversion even is not equivalent to the second conversion event. In some examples, a first conversion event may comprise purchasing a first product, and a second conversion event may comprise purchasing a second, different product. In another example, a first conversion event may comprise subscribing to a first service at a first price, and the second conversion event may comprise subscribing to the first service at a second price, wherein the first price is not equal to the second price. In yet another example, a first conversion event may comprise completion of an enrollment application (e.g., for insurance, college, or other service or subscription), and a second conversion event may comprise actual enrollment (e.g., in the insurance program, college, or other service or subscription).

The disclosed techniques for analyzing and characterizing the relative propensity of a lead to convert to the targeted "conversion event" advantageously enables businesses to better focus both their sales development process and their ongoing lead-generation marketing efforts by: rejecting for purchase very low-quality leads offered by lead providers, or discarding similar internally-generated leads; prioritizing the best quality leads within their sales nurturing funnel; and optimizing the efforts of their workforce by forwarding to them only the more promising leads.

Figure 1:
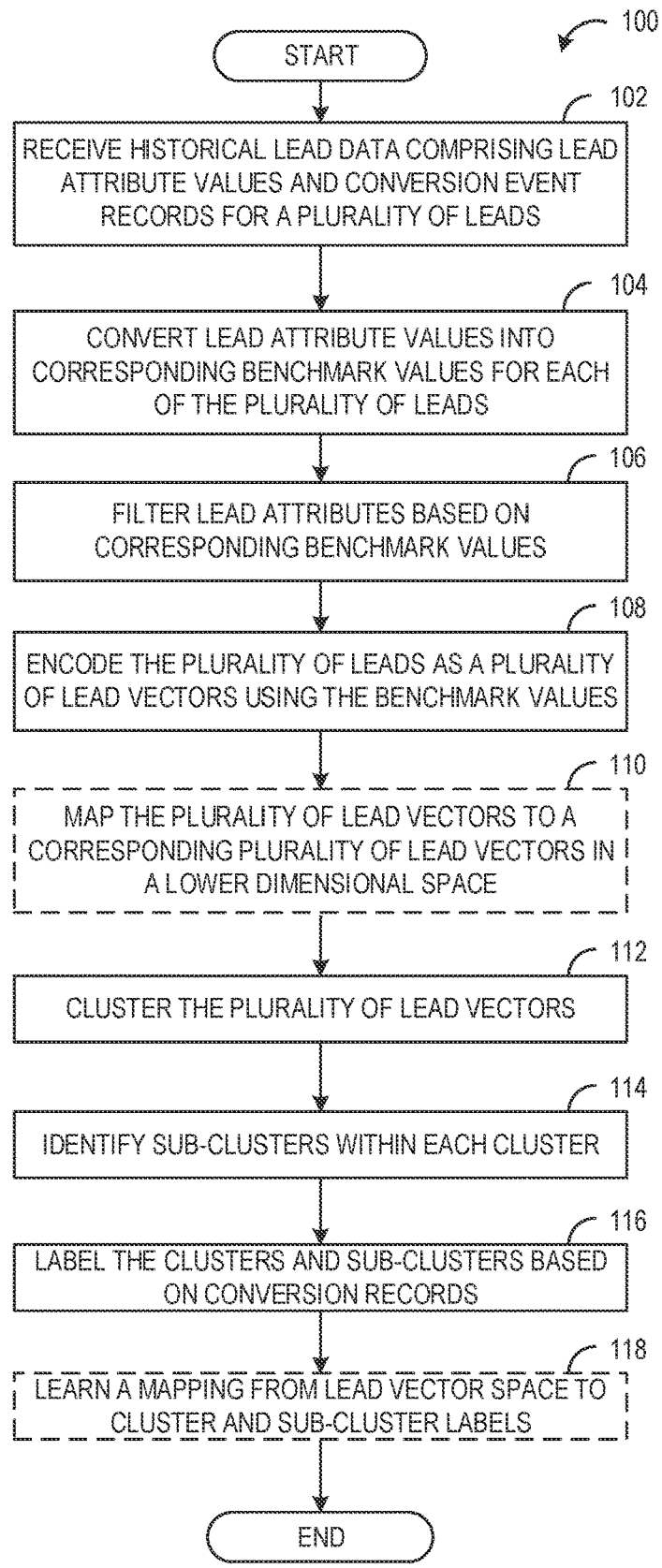
FIG. 1 is a flow diagram of an exemplary method for clustering and grading historical lead data of a lead consumer.

In one embodiment, a lead grading platform may execute one or more operations of method 100, shown in FIG. 1, to encode historical lead data as a plurality of lead vectors (wherein each lead vector comprises a plurality of benchmark values), and cluster the plurality of lead vectors to form a plurality of clusters. Each of the plurality of clusters may be assigned a cluster label indicating a ranking, or grade, based on the average conversion rate of the lead vectors assigned to the cluster. The lead grading platform may then execute one or more of the operations of method 200, shown in FIG. 2, to automatically, and in real-time, grade a new lead by encoding the new lead as a lead vector, assigning the lead vector to a previously obtained cluster and/or sub-cluster, and grading the new lead based on the assigned cluster/sub-cluster. As used herein a "newly acquired lead" or "new lead" refers to a lead which has not previously been delivered by a particular lead vendor, and/or which was not included in a historical dataset from which an initial plurality of clusters were obtained, and does not indicate an age of a lead.

Figure 3:
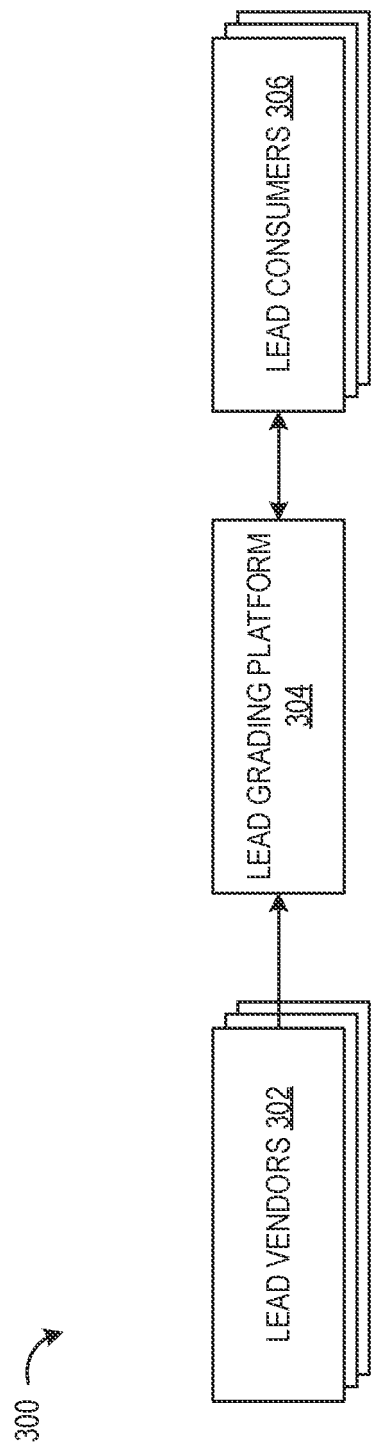
FIG. 3 illustrates a lead distribution system comprising a plurality of lead vendors, a lead grading platform, and a plurality of lead consumers.

FIG. 3 shows a lead distribution system 300, wherein a lead grading platform 304 is communicably coupled with a plurality of lead vendors 302, and a plurality of lead consumers 306. The lead grading platform 304 may deliver leads provided by the plurality of lead vendors 302 to one or more of the plurality of lead consumers 306 based upon the provided leads satisfying one or more quality criterion. In one example, the lead grading platform 304 may grade the plurality of provided leads, and deliver one or more of the delivered leads in response to said one or more delivered leads having a grade above a threshold grade. FIGS. 4 and 5 show example graphical user interfaces 400 and 500, respectively, which may be displayed to a lead consumer, summarizing information pertaining to previously delivered leads. FIG. 6 shows a graphical user interface summarizing conversion statistics for a plurality of leads delivered to a lead consumer.

As used herein the term "lead" generally refers to either or both of the following: a person or entity that shows a certain level of interest in at least one identified product and/or service; and data identifying an entity as a potential customer/buyer of at least one identified product and/or service. Each lead generally has multiple lead attributes that may each be captured in a designated field that corresponds to the lead. These lead attributes may include personal contact information (e.g., first name, last name, email, phone number, and mailing and/or residence address), lead source information (e.g., campaign, campaign tactic, and lead provider), and product information (e.g., type of product, price of product, product name, and product characteristics). As used herein, a lead attribute value refers to a particular value of a lead attribute, e.g., for a lead attribute "gender" a corresponding lead attribute value may be "male".

Implementations of the disclosed technology generally include extrapolated lead data, which may be obtained by using information provided with a lead and appending certain data thereto in order to augment the data richness of the lead. For example, geographic information such as a zip code corresponding to a certain lead may be appended to demographic information of that lead, indicating the relative propensity of other Individuals residing within that zip code to convert to the targeted event.

Implementations of the disclosed technology may also include lead meta data, which generally refers to information that can be generated while processing the lead but may not be part of the lead data. Lead meta data may include information such as the timestamp of the lead submission and time/duration used to fill out a form, for example.

Implementations of the disclosed technology may supplement lead data acquired from a lead vendor (that is, a collection of lead attribute values pertaining to an individual) using data acquired from external sources (e.g., third party data aggregators, inference models, or other sources). This supplemental lead data may include those personal attribute values which are known, or are believed and likely to be known, about the individual. In some embodiments, dozens and sometimes hundreds of lead attribute values are added via external sources or inference models, expanding the universe of "know attributes" related to the lead (individual). The inclusion of these extraneous attributes may provide a more holistic "personas", encoded as data, around both the provided historical data, and the newly acquired lead data, contributing to the determination as to which cluster to assign a lead to. The plurality of lead attribute values may include supplemental or inferred values, which may be acquired from third party sources, or may be inferred or interpolated based on other lead attribute values, thereby bolstering a number of data points pertaining to a lead.

As used herein, the term "conversion" generally refers to a lead that ends in a targeted "conversion event" (e.g., a sale, completed application, subscription to a service, or any other step in the sales process that can be consistently tracked as progress towards a target outcome). The term "conversion rate" generally refers to a ratio between conversions and all leads submitted and validated that are delivered to a lead consumer.

A conversion rate (e.g., a ratio between converted leads and all delivered leads) is generally in a range of [0, 1] and may be determined in accordance with the following equation:

$$CRate = \frac{Conversions}{Leads}$$

Implementations of the disclosed technology generally include predictive grading models that may be used to calculate a "contribution value" of each lead attribute with respect to its impact on the projected conversion rate for each lead. For example, considering an attribute "A" and a value "V" for that attribute, the conversion rate when A=V may be determined in accordance with the following equation:

$$CRate_{A=V} = \frac{Conversions_{A=V}}{Leads_{A=V}}$$

where $CRate_{A=V}$ will be in the [0, 1] range and can be: higher than CRate (e.g., this range will generally indicate those leads that are more likely to convert); equal (or close) to CRate (e.g., this range will generally indicate those leads that are likely to perform like the "average" lead); or lower than CRate (e.g., this range will indicate those leads that are less likely to convert).

Certain implementations may include using CRate as a benchmark. Such implementations may include calculating how a specific value in an attribute may affect the expected conversion rate. For example, given an attribute "A" and a value "V" for that attribute, a benchmark value $B_{A=V}$ may be calculated in accordance with the following equation:

$$B_{A=V} = \frac{CRate_{A=V}}{CRate}$$

The $B_{A=V}$ benchmark value may be calculated using the weighted values of attributes from recent leads and conversions, and then applied to compare the "persona" of new leads with values for the global set of identifiable attributes of all the leads within that population. This benchmark value may have certain properties depending on where it is within the range. For example, if it is in the [0, 1) range, leads with that specific value may tend to convert at a lower rate than the average lead; if it is 1 (or really close to 1), leads with that specific value may convert at a similar rate compared to the average lead; and if it is higher than 1, leads with that specific value may tend to convert better than the average lead.

Among the various advantages of using benchmark values instead of conversion rates of historical leads is that, because of the nature of leads, their demographic and behavioral attributes and their respectively assigned attribute values tend to change over time, impacting their likely conversion rates. This is especially true for seasonal businesses (such as education, insurance, retail, new cars, and hospitality, for example) where the proximity of a consumer's submission of an inquiry (i.e., lead) to certain dates will correlate to the general behavior (e.g., outcomes) of the leads in that target population.

The benchmark values will generally be more stable since the system generally models how much better a lead is compared to the average at any given time (e.g., month/year). Such influences may also apply when considering the time of the day, or day of the week, that a lead is created (e.g., the time at which the consumer submits a lead). Such implementations may include converting all values that are heterogeneous into numerical values that are normalized. New values may be normalized as well, so a model won't necessarily need to be retrained just because new data is received.

Turning to FIG. 1, a flow diagram of a method 100 for clustering a plurality of leads based on conversion probability is shown. Method 100 may be encoded as instructions stored in non-transitory memory, and executed by a lead grading platform, such as lead grading platform 304, to process historical lead data from a lead consumer, thereby identifying distinct "classes" or grades of leads in terms of conversion probability. It will be appreciated that the terms lead grading platform, and lead grading system, are used interchangeably herein.

Method 100 begins at operation 102, wherein the lead grading platform receives historical lead data comprising lead attribute values and conversion event records for a plurality of leads. In one example, a lead consumer may register with a lead platform, and may transmit historical lead data, comprising a plurality of leads (each including one or more lead attribute values) and a plurality of conversion event records corresponding to the plurality of leads, to the lead grading platform. The conversion event records may indicate for each of the plurality of leads, if a particular lead resulted in a targeted conversion event. In some embodiments the plurality of conversion event records may comprise binary data, wherein if a first lead resulted in the targeted conversion event, a conversion event record associated with the first lead is set to a first, pre-determined value (indicating the conversion event occurred), and wherein if a second lead does not result in the targeted conversion event, a conversion event record associated with the second lead may be set to a second, pre-determined value (indicating the conversion event did not occur). In some embodiments, the conversion event records may include additional data beyond a record of the occurrence/non-occurrence of the conversion event, such as a conversion event date, a conversion event time, a reason provided for non-conversion, etc.

At operation 104, the lead grading platform converts the lead attribute values of each of the plurality of leads into corresponding benchmark values. In some embodiments, the lead grading platform converts the plurality of lead attribute values of each of the plurality of leads into the corresponding plurality of benchmark values based on the plurality of conversion event records, by determining a first (overall) conversion rate for the plurality of leads based on the plurality of conversion event records, determining a second conversion rate for a subset of the plurality of leads based on the plurality of conversion event records, wherein the subset comprises leads of the plurality of leads with a first lead attribute value, determining a benchmark value by dividing the second conversion rate by the first conversion rate, and replacing the first lead attribute value by the benchmark value in each lead of the subset of the plurality of leads. As an example, a first (overall) conversion rate for the plurality of leads may be determined according to the following equation:

$$CRate = \frac{Conversions}{Leads}$$

Wherein CRate is the first (overall) conversion rate of the historical leads, given as the ratio of all conversions (Conversions), as recorded in the conversion event records, to the number of the plurality of leads (Leads), as determined by tallying the total number of leads in the historical lead data. The second conversion rate, $CRate_{A=V}$, is given by:

$$CRate_{A=V} = \frac{Conversions_{A=V}}{Leads_{A=V}}$$

Wherein $Conversions_{A=V}$ is the total number of conversions of leads with attribute A equal to value V, as indicated by the conversion event records, and $Leads_{A=V}$ is the number of leads in the subset of leads (wherein the subset of leads are the leads in the plurality of leads with attribute A equal to value V).

A benchmark value ($B_{A=V}$) may then be determined for the subset by dividing the second conversion rate ($CRate_{A=V}$) by the first conversion rate (CRate), as shown below:

$$B_{A=V} = \frac{CRate_{A=V}}{CRate}$$

Each of the values V in the subset of leads may then be replaced by the benchmark value ($B_{A=V}$).

As a more specific example, if the historical lead data includes 124 leads, each comprising the lead attributes of name, age, and address, and the associated conversion event records indicate 31 of the 124 leads resulted in a predetermined conversion event (e.g., subscribing to a monthly subscription service), the CRate for this historical lead data is 31/124, or 0.25. Further, if the historical lead data includes a subset of 10 leads with a lead attribute of age equal to 30, and the conversion event records indicate 4 of the 10 leads of this subset converted, the $CRate_{age=30}$ for this subset is 4/10, or 0.40. Thus, a benchmark value for this subset of 10 leads, $B_{age=30}$, is 0.4/0.25, or 1.6. Therefore, the attribute value age=30 in each of the 10 leads in the subset may be converted to the corresponding benchmark value 1.6. In some examples, attribute values may be grouped, and benchmark values for the grouped attribute values may be determined, such as by evaluating age ranges (e.g., 20-30), and determining benchmark values for said age ranges, as opposed to determining attribute values for each distinct integer age value.

The lead grading platform may repeat the above step for each distinct lead attribute value present in the historical lead data, until all lead attribute values are replaced by corresponding benchmark values.

At operation 106, the lead grading platform filters lead attributes from the historical lead data based on corresponding benchmark values to produce a plurality of filtered benchmark values. Selecting informative and non-correlated features for use in training a statistical or machine-learning model is an important and challenging step in the process of converting "raw" data-sets into a more manageable and efficient feature set, e.g., in order to produce a predictive model with high efficacy and accurate grading results in a consistent and cost-effective manner. Thus, at operation 106 the lead grading platform evaluates the plurality of lead attributes and determines which attributes to use for encoding leads as lead vectors, and which attributes to discard/filter-out.

The use of benchmark values may advantageously simplify the process of filtering the lead attributes, as it may allow for generalizing the process to accommodate different types of data that may be associated with the plurality of leads and influence their likelihood to convert to the target outcome. Several mathematical and statistical treatments may be applied during the filtering process at operation 106, to identify those lead attributes that contribute positively to the efficacy of the model, e.g., as opposed to attributes that may erode or otherwise skew the correlation of the combined set of attributes for a given lead (i.e., the consumer persona) to the personas of historical leads that may have achieved the targeted outcome.

In some embodiments, for a given attribute A, if the benchmark values ($B_{A=V}$) for all values of V included in the historical data are within a threshold above or below 1, or equal to 1, it may indicate that attribute A is not giving any useful information that would contribute to differentiating the leads with respect to relative quality. In such situations, at operation 106, the lead grading platform may filter out attribute A. In a more specific example, if a plurality of leads include a lead attribute of "gender", and for each distinct attribute value of name (e.g., "male", "female", etc.) all corresponding benchmark values are within a threshold of, or equal to, 1, the attribute "gender" may be filtered out. Or in other words, the benchmark values derived from the "gender" attribute may be discarded.

In some embodiments, for a given attribute A, if a significant portion of the corresponding benchmark values are greater than a threshold, (e.g., substantially greater than an average benchmark value), it may indicate that the attribute is too correlated with the conversion event and perhaps should be discarded. This is generally the case when these attributes (and their respective values) are generated at the time of, or after, the acquisition of the lead. Further, attributes which may not be available at the time of lead acquisition (e.g., attributes generated during the lead nurturing phase, including those that were generated when the lead converts) may be excluded. In other words, when working with historical datasets, attributes that may not be available when a newly acquired lead is graded may be discarded.

In some embodiments, at operation 106, the lead grading platform analyzes the correlations between pairs of attributes (e.g., a first attribute X and a second attribute Y), the platform may determine an extent of correlation between the first attribute and the second attribute, and may respond to the extent of correlation exceeding a correlation threshold by discarding one of the pair of attributes (e.g., discarding either the first attribute X or the second attribute Y). In this way, redundant information/features/attributes may be excluded from a vector representation of leads, thereby increasing a computational efficiency of the process of encoding leads as vectors, while preserving an information content of the lead in the vector encoded form.

At operation 108, the lead grading platform encodes the plurality of leads as a plurality of lead vectors using the filtered benchmark values. In some embodiments, operation 108 comprises assembling filtered benchmark values for each of the plurality of leads into a corresponding plurality of lead vectors. As an example, for a lead comprising the attributes of "age", "name", "address", and "income", with attribute values of "43", "John Doe", "Portland, OR", and "$80,000", corresponding benchmark values of "0.92", "1.01", "1.2", and "1.6", and filtered benchmark values of "0.92", "1.2", and "1.6" (the "name" attribute has been filtered out in this example) the lead may be encoded as a lead vector, $[0.92, 1.2, 1.6]^T$. The lead vectors may be interpreted as points in N-dimensional space, herein referred to as a lead vector space, wherein N is a positive integer greater than 0, which corresponds to the number of unfiltered attributes (e.g., in the immediately preceding example the lead vector is three-dimensional, therefore N=3).

At operation 110, the lead grading platform optionally maps the plurality of lead vectors from a first lead vector space to a second lead vector space, wherein the second lead vector space is of lower dimension than the first lead vector space. In some embodiments, mapping the plurality of lead vectors from the first lead vector space to the second lead vector space (i.e., dimensionality reduction) may comprise using principal component analysis (PCA) or a self-organizing map (SOM) network. By mapping the plurality of lead vectors to a lower dimensional space, information encoded by the plurality of lead vectors may be substantially preserved while being represented in a more compact form, thereby reducing a memory footprint of the plurality of lead vectors, and reducing a computational complexity of downstream tasks such as computing distances between lead vectors. Further, vectors in lower dimensional spaces (e.g., in 2D or 3D lead vector spaces) may be more efficiently visually rendered.

At operation 112 the lead grading platform clusters the plurality of lead vectors, to form a plurality of clusters. Clustering the plurality of lead vectors comprises assigning each of the plurality of lead vectors to one of a plurality of groups, referred to as clusters. In some embodiments, the lead grading platform may use one or more clustering algorithms known in the art of unsupervised machine learning, including but not limited to, k-means, DBSCAN, Gaussian mixture models, Balance Iterative Reducing and Clustering using Hierarchies (BIRCH), HDBSCAN, Affinity Propagation clustering, Mean-Shift clustering, Ordering Points to Identify the Clustering Structure (OPTICS), and Agglomerative Hierarchy clustering. In some clustering algorithms a number of clusters may be set as a hyperparameter, while in others the algorithm determines the number of clusters automatically. For some algorithms, such as k-means, the identified clusters may be compactly represented as k centroids located in the lead vector space. In other algorithms, clusters may be of irregular and complex geometries, which may not be compactly represented. In some embodiments, one or more of the plurality of lead vectors may be designated as outliers and discarded (that is, may not be assigned any cluster of the plurality of clusters). Following operation 112, each of the plurality of lead vectors is designated as belonging to one of a finite number of clusters (excluding outliers).

At operation 114, the lead grading platform identifies one or more sub-clusters within the plurality of clusters identified at operation 112. Sub-clusters may be identified to model varying levels of quality within a grade designation (e.g., "A+" or "B−" grades). This may be achieved by the platform again applying clustering algorithms within each lead cluster. In some embodiments, the lead grading platform identifies sub-clusters within a cluster of the plurality of clusters by selecting a subset of the plurality of lead vectors assigned to a first cluster of the plurality of clusters, and repeating the clustering algorithm performed at operation 112 on the subset of the plurality of lead vectors to identify one or more sub-clusters within the first cluster. This process may be repeated for each of the plurality of clusters. In some embodiments, a different clustering algorithms are used at operation 112 and operation 114.

At operation 116, the lead grading platform labels each of the plurality of clusters and the plurality of sub-clusters based on the plurality or conversion event records received at operation 102. For example, the platform may analyze the performance (e.g., the conversion percentage) within each cluster and sort them based on the cluster's relative performance to convert. Such embodiments may include assigning a first label (e.g., an "A" label) to the best performing cluster, a second label (e.g., a "B" label) to the next best performing cluster, and so on until all of the clusters have been labelled. In some embodiments, an average conversion rate or average conversion probability is determined for each of the plurality of clusters and sub-clusters, and a grade/rank/label is assigned to each of the plurality of clusters and sub-clusters based on the average conversion rates. An average conversion rate or average conversion probability may be determined for a cluster/sub-cluster by dividing a total number of conversion events associated with lead vectors assigned to the cluster/sub-cluster, by a total number of lead vectors assigned to the cluster/sub-cluster. As an example, a cluster comprising 100 leads, wherein 20 of the 100 leads converted (that is, attained a targeted conversion event, as indicated by the plurality of conversion event records), has a conversion rate of 0.20. A conversion rate of a cluster may also herein be referred to as a cluster conversion rate.

In one example, if at operation 112 four clusters are identified, wherein the four clusters have respective cluster conversion rates of 0.20, 0.15, 0.06, and 0.015, labels may be assigned to each of the four clusters based on a ranking of the cluster as determined by a respective cluster conversion rate. In the immediately preceding example, the clusters with cluster conversion rates of 0.20, 0.15, 0.06, and 0.015 may be labeled as "1", "2", "3", and "4", respectively, or alternatively may be labeled as "A", "B", "C", and "D", respectively.

Further, at operation 116 the lead grading platform assigns sub-grades, sub-ranks, or sub-labels to the sub-clusters identified in each of the plurality of clusters. As an example, if a first sub-cluster and a second sub-cluster are identified within a cluster labeled "A", the first sub-cluster may be assigned a label of "A+" and the second sub-cluster may be assigned a label of "A−", wherein the first sub-cluster has a higher conversion rate than the second sub-cluster.

At operation 118, the lead grading platform may optionally learn a mapping from the lead vector space to the labels and sub-labels of the plurality of clusters and sub-clusters. In some embodiments, a labeled training data set may be generated by pairing each of the plurality of lead vectors with an assigned label and/or sub-label, to form a plurality of training data pairs, wherein the assigned label and/or sub-labels serve as the ground truth data. The plurality of training data pairs may be used to train a neural network to learn a mapping from the feature vector space to the labels and/or sub-labels of the clusters and/or sub-clusters, using methods known in the art of supervised machine learning. In one example, a lead vector may be fed to an input layer of a neural network, the lead vector may then be mapped to a cluster label prediction by the neural network, and a loss for the cluster label prediction may be determined by comparing the cluster label prediction with the ground truth cluster label (that is, the label assigned to the lead vector at operation 114 and/or 116 above). The parameters of the neural network may then be updated based on the loss, using one or more gradient descent algorithms known in the art of neural networks, and the process may be repeated for each of the plurality of training data pairs. In this way, new leads may be efficiently and rapidly mapped to cluster labels, without repeating a clustering process. For some clustering algorithms, such as k-means, a new lead may be efficiently mapped to a cluster and/or sub-cluster label without need for a learned mapping, as in k-means vectors are assigned to a closest cluster (a cluster with a smallest distance between the vector and a centroid of the cluster).

Following operation 118, method 100 may end. As can be seen, method 100 enables existing lead data (that is, historical lead data) from a lead consumer to be analyzed for cluster structure, allowing for categorization of existing leads into a finite number of classes/grades/ranks, based on conversion rate. Further, the clusters and sub-clusters identified in method 100 enable for real time grading of new leads, such as is described in more detail with reference to method 200, below.

Figure 2:
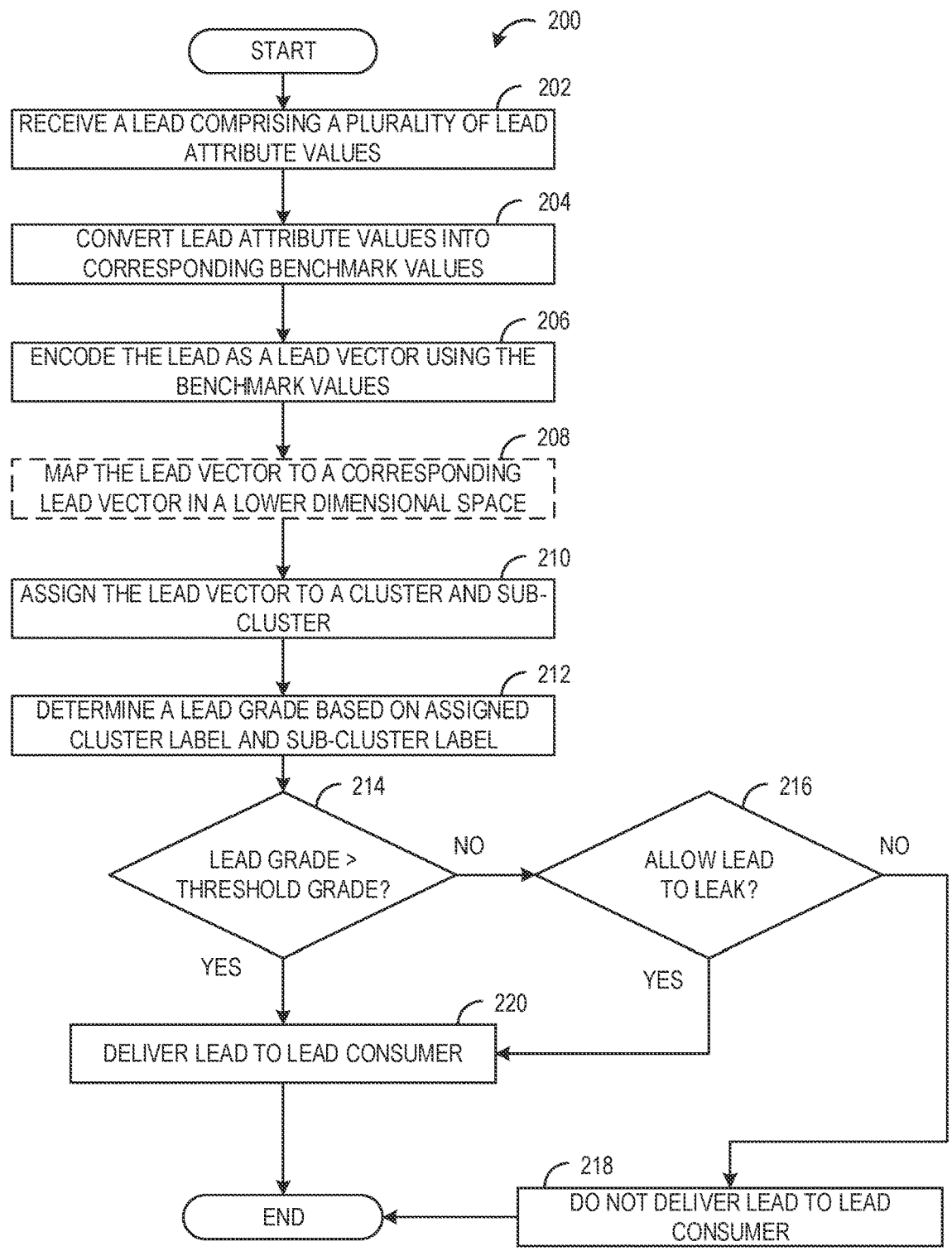
FIG. 2 is a flow diagram of an exemplary method for analyzing and grading leads in real-time.

Turning to FIG. 2, a method 200 for automatically grading leads in real time, is shown. Method 200 may be stored as instructions in non-transitory memory, and executed by one or more processors of a lead platform, to grade one or more leads, received from one or more of a plurality of lead vendors or other lead sources. In some embodiments, method 200 may be executed to automatically deliver leads satisfying one or more quality criterion to one or more lead consumers.

Method 200 begins at operation 202, where the lead grading platform receives a lead from a lead vendor, wherein the lead comprises a plurality of lead attribute values. In some embodiments, lead attributes may comprise one or more of a first name, a last name, an email address, a phone number, a mailing address, a residence address, a campaign (a sales campaign associated with the target conversion event), a campaign tactic (e.g., door-to-door, email, social media, etc.), a lead provider/vendor, as well as one or more lead attributes pertaining to the targeted conversion event, such as a type of product/service being sold, a cost of the produce/service, a product/service name, and product/service features/characteristics. In some embodiments, the lead grading platform may supplement lead attribute values obtained from a lead vendor with additional lead attribute values, which, in some embodiments, may be obtained from third party data aggregators, inference models, etc. In some embodiments, supplemental lead values may include externally acquired demographic, financial and personal data attributes associated with the individual represented by the lead data. The supplemental lead attribute values may bolster a number of data points pertaining to a lead, increasing the robustness and accuracy of the systems and methods disclosed herein. In particular, by producing a more holistic digital representation of a lead (e.g., a more robust lead vector representation created by encoding lead attribute values and supplemental lead attribute values), a clustering of leads may be enhanced.

At operation 204, the lead grading platform converts the plurality of lead attribute values to a corresponding plurality of benchmark values based on historical lead data. In some embodiments, the lead platform may convert the plurality of lead attributes to benchmark values in a substantially similar manner as described above with reference to operation 104, in FIG. 1 above, with the exception that lead attributes filtered out at operation 106 of method 100 may not be evaluated/converted at operation 204, as these lead attributes do not influence the lead cluster assignment. In some embodiments, the lead grading platform may replace the raw values for each attribute with a corresponding benchmark value.

At operation 206, the lead grading platform encodes the lead as a lead vector by assembling the plurality of benchmark values determined at operation 204 into a lead vector. In some embodiments, this process may include encoding a lead, comprising lead attribute values of different data types (such as alpha-numeric strings and/or numerical ranges, for example) into a numeric vector. For example, a lead comprising the lead attribute values of [program name=MBA, and program type=Master], may be converted into [program name=1.7, program type=1.2].

At operation 208, the lead grading platform may optionally map the lead vector from a first lead vector space with a first dimension, to a second lead vector space with a second dimension, wherein the first dimension is greater than the second dimension. In particular, a same mapping as is applied at operation 110 may be applied to the lead vector at operation 208, thereby mapping the lead vector received at operation 202 to a corresponding lead vector space as the plurality of historical lead vectors were mapped in method 100.

At operation 210, the lead grading platform assigns the lead vector to a pre-determined cluster and/or sub-cluster label. In some embodiments, the lead grading platform may employ a trained neural network (such as the neural network discussed above at operation 118 of method 100), to map the lead vector to a cluster label and/or a sub-cluster label. In some embodiments, the previously determined clusters and/or sub-clusters may be used to assign a cluster label and/or a sub-cluster label to the lead vector. In some embodiments, the lead vector may be compared against historical lead vectors (which were previously assigned to clusters/sub-clusters) and may be assigned a cluster label and/or sub-cluster label based on a proximity and/or density of historical lead clusters to the "new" lead vector. As an example, a lead vector may be assigned to a previously determined cluster (and therefore given a same label as the cluster) based on a distance between the lead vector and a centroid of the cluster being less than for any of the other previously determined clusters. In another example, a lead vector may be assigned to a cluster based on a k-nearest neighbors approach, wherein the most prevalent label of the k-nearest historical lead vectors is assigned to the "new" lead vector. In some embodiments, assignment of a cluster label and sub-cluster label may occur simultaneously, whereas in some embodiments assignment of the cluster label and the sub-cluster label may occur sequentially. In some embodiments, a lead vector may be mapped to cluster label using a first trained neural network, and may be mapped to a sub-cluster label using a second trained neural network. In some embodiments, a single neural network may be used to map a lead vector to a cluster and a sub-cluster label. Similarly, a lead vector may be assigned a cluster label and a sub-cluster label either consecutively or simultaneously using a k-nearest neighbors approach. In some embodiments, a pre-trained neural network may be used to map the lead vector to a cluster to determine a grade of the lead, then a subgrade may be determined based on the proximity of the lead in the lead vector space to the centroid that is identified as the "subgrade centroid".

At operation 212, the lead grading platform determines a lead grade for the lead based on the assigned cluster label and the assigned sub-cluster label. In some embodiments, the lead grade may be set as the cluster label and sub-cluster label, e.g., a lead assigned a cluster label of "A" and a sub-cluster label of "−" may be determined to have a lead grade of "A−". In some embodiments, the lead grade may be determined by converting the cluster label and sub-cluster label to numerical values, e.g., by mapping a cluster label of "Best" to a first value of 95, and mapping a sub-cluster label of "−" to a second value of −2, producing a lead grade of 93 by adding first value with the second value.

At operation 214, the lead grading platform compares the lead grade with a pre-determined lead grade threshold. The lead grade threshold may be stored in non-transitory memory of the lead grading platform, enabling the lead grading platform to automatically determine if newly acquired leads satisfy the quality criterion of a lead consumer. In some embodiments, the lead grade threshold may be established by a lead consumer, and may indicate a minimum acceptable lead quality. If at operation 214 it is determined that the lead grade is greater than the lead grade threshold, method 200 proceeds to operation 220, wherein the lead grading platform delivers the lead to the lead consumer. In some embodiments, delivering a lead to a lead consumer may comprise electronically transmitting the lead, along with the lead grade, to a lead consumer device/dashboard.

However, if at operation 214 it is determined that the lead grade is below the lead grade threshold, method 200 may proceed to operation 216. At operation 216, the lead grading platform determines if the "rejected" lead should be leaked (aka; "delivered") to the lead consumer. As used herein, the term leaked refers to allowing a pre-determined fraction of "rejected" leads to be delivered to a lead consumer, in order to validate/evaluate a performance of the lead grading process. In one example a pre-determined fraction of leads with a lead grade below the lead grade threshold may be randomly leaked, in order to assess a conversion difference between the leaked leads and the leads with a lead grade greater than the lead grade threshold. In one example, at operation 216, a random number or pseudo-random number may be generated within a pre-determined range of values (e.g., between 0 and 1) and if the random number is below a pre-determined value within the range of values, the lead may be leaked. In another example, a schedule may be used to determine if a current rejected lead is to be leaked (e.g., every $N^{th}$ rejected lead may be leaked, wherein N is a positive integer greater than 1).

In some embodiments, a probability of leaking a lead may be based on the grade/label assigned to the lead, and may further be based on an average conversion rate of the grade to which the lead is assigned. In one example, in order to monitor the performance of the grading model and the efficacy of the filtering settings, quality based leak rates may be applied (leak rates that are a function of a grade assigned to a lead). For example, a leak rate of 20% may be determined for leads assigned a grade of "D", whereas a leak rate of 4% may be determined for leads assigned a grade of "F", in order to monitor the conversion rate of the "D" leads, and the "F" leads. The number of leads leaked may depend on the expected volume of leads for that grade and the expected number of conversions. For example, the number of leaked leads may be determined based on an expected conversion rate for leads of a given grade, and further based upon a volume of leads of the grade, wherein the number of leaked leads may increase as the expected conversion rate decreases, and the rate of leakage may decrease as the volume of the leads increases. For example, if the historical conversion rate of leads assigned a grade of "D" is 1%, and a volume of leads with grade "D" is 1,000 (per unit time), a leak rate of 20%, equating to 200 observations/leaked leads, may be determined, enabling an expected observation of 2 conversion events for the 200 leaked leads. Similarly, if the historical conversion rate of leads with grade "F" is 0.5%, and the volume of leads with grade "F" is 10,000, a leak rate of 4%, equating to 400 observations/leaked leads, may be determined, enabling an expected observation of 2 conversion events for the 400 leaked leads. It will be appreciated that the desired number of observations may be different than 2, and may be selected based on lead grade. In this way, a percentage of leads to be leaked may be determined which adequately monitors the performance of the grading models.

If at operation 216 it is determined that the lead is not to be leaked, method 200 proceeds to operation 218, wherein the lead grading platform does not deliver the lead to the lead consumer. However, if at operation 216 it is determined that the lead is to be leaked, method 200 proceeds to operation 220, wherein the lead grading platform delivers the lead to the lead consumer. Following operation 220, method 200 may end.

Turning to FIG. 3, a lead distribution system 300 is shown. Lead distribution system 300 includes a lead grading platform 304, communicably coupled to a plurality of lead vendors 302, and a plurality of lead consumers 306, via wired or wireless coupling, such as via a public or private network such as the Internet. The lead grading platform 304 may also be referred to herein as a lead grading system, and may comprise a processor, and non-memory, wherein the processor may execute instructions stored in the non-transitory memory to perform one or more of the operations disclosed herein. Lead grading platform 304 may receive a plurality of leads from the plurality of lead vendors 302, and may evaluate/grade the plurality of leads to determine which of the plurality of leads are to be removed/filtered out, and which are to be delivered to one or more of the plurality of lead consumers 306.

Certain implementations of the disclosed technology may include boost factors that, as used herein, generally refers to a manifestation of relative quality delta between sub-clusters, e.g., as derived from calculated values acquired at two points in the overall grading process, including at the creation of a baseline predictive grading model, whereby a boost factor may be associated with each grade-level (e.g., including sub-grades, and plus/average/minus), indicating a general probability that a lead given each grade level will result in a conversion to the targeted event or status (e.g., qualified prospect, completed application, and sale). The baseline boost factor may be based on the historical experience of the lead consumer derived from historical data (e.g., both non-converting leads and converting leads). The historical data-set used typically includes data from a prior period (e.g., up to 15 months or longer in certain cases), in order to capture signal from a comprehensive set of variables such as annual seasonal influences, range of lead sources, range of lead types, and other variables sourced from the original lead form fields, for example.

FIG. 4 is an example of a user interface 400 visually displaying a lead consumer's baseline model stats in accordance with certain implementations of the disclosed technology. The user interface 400 provides example boost factors corresponding to various grades and sub-grades.

Certain implementations in which a base model has been deployed may further include dynamic grading, also referred to herein as boost factor calculations. In such implementations, new leads submitted from a lead vendor via the disclosed platform may be "graded" in real-time (e.g., on a scale between 0-100) using the baseline model, and then "graded" by incorporating the subsequent lead data and/or conversion event disposition data of all subsequent lead activity up to the current time, subsequently outputting a "grade" (e.g., on a scale from A+ to G− or a truncated scale within that range, as determined by the natural distribution of the lead consumer's overall lead population and the commensurate calculations of the grading engine itself, for example).

This secondary grading process may advantageously provide a higher degree of correlation of relative quality within the various grade levels as well as a higher degree of separation of relative quality clusters across the alpha grade levels. Within the sub-grade levels of each alpha grade clusters (e.g., plus, average, and minus), the disclosed grading engine may calculate a varying degree of quality correlation to conversion potential within those "sub clusters."

FIG. 5 illustrates an example of a user interface 500 visually displaying dynamic stats for the lead consumer of FIG. 4 in accordance with certain implementations of the disclosed technology. The user interface 500 indicates that the range of "boost" for each grade level has changed—this may be due to various changes in the nature of the submitted lead population and the associated "life data attributes" appended by the disclosed grading process during the subsequent time period, which may provide additional current "signal values" that the grading algorithm may apply in order to calculate the boost factor.

Certain implementations may further include a dynamic filtering engine. As used herein, the term "filtering" generally refers to a process for rating an incoming lead record (e.g., generally a new sales lead submitted by a paid-lead provider for consideration for purchase by the lead buyer/ lead consumer) by which the disclosed platform may grade/ grade the lead with respect to whether the lead achieves a minimum grading threshold, above which the buyer generally has agreed with the vendor to purchase all leads achieving that threshold. In such implementations, leads that do not achieve the designated threshold may not be accepted, and a response documenting the rejection may be sent back to the lead vendor. Various corresponding settings can be varied for individual lead sources, or by the specific "type" of lead submitted, for example.

The disclosed filtering function may advantageously incorporate the disclosed grading/grading engine outputs as the basis for applying the filtering threshold(s). This process is unique with respect to the methodology employed to systematically test the efficacy of the boost factor, and then dynamically modify and apply an associated "leakage" function which serves to constantly assess the efficacy of the grading output, e.g., by measuring and displaying the effectiveness of the filtering settings. This efficacy may be assessed by tracking the conversion rate of the volume of leads which, although targeted for filtering based on the established threshold, may be allowed to "leak" through the filter (and may then subsequently be processed by the lead consumer's sales team, for example).

In certain implementations, the resulting delta of the "conversion rate" of the leaked leads within each filtering gradient versus the corresponding conversion rate of the leads that were outright "accepted" within that gradient level based on their grades exceeding the base filtering threshold over a specified time period, may be used as the basis for determining the effectiveness of the filtering methodology in rejecting lower quality leads and thereby increasing the potential conversion rate of the population of "accepted" leads. The assumption is that a buyer will over time purchase the same or similar volume of leads from vendor(s) that achieve the relatively higher average quality threshold.

FIG. 6 illustrates an example of a user interface 600, visually displaying the impact of filtering lower quality leads in accordance with certain implementations of the disclosed technology. Notably, the user interface 600 provides that the overall conversion rate is 2.06% versus the average of the leaked conversion rates of 0.49%.

The disclosure also provides support for a method comprising: receiving historical lead data, wherein the historical lead data comprises a plurality of leads and a plurality of conversion event records for the plurality of leads, wherein each lead of the plurality of leads comprises a plurality of lead attribute values, converting the plurality of lead attribute values of each of the plurality of leads into a corresponding plurality of benchmark values based on the plurality of conversion event records, encoding the plurality of leads into a plurality of lead vectors, clustering the plurality of lead vectors to form a plurality of clusters, and determining a plurality of cluster labels for the plurality of clusters based on the plurality of conversion event records. In a first example of the method further comprising: identifying sub-clusters in each of the plurality of clusters to form a plurality of sub-clusters, and determining a plurality of sub-cluster labels for the plurality of sub-clusters based on the plurality of conversion event records. In a second example of the method, optionally including the first example, converting the plurality of lead attribute values of each of the plurality of leads into the corresponding plurality of benchmark values based on the plurality of conversion event records comprises: determining a first conversion rate for the plurality of leads based on the plurality of conversion event records, determining a second conversion rate for a subset of the plurality of leads based on the plurality of conversion event records, wherein the subset comprises leads of the plurality of leads with a first lead attribute value, determining a benchmark value by dividing the second conversion rate by the first conversion rate, and replacing the first lead attribute value by the benchmark value in each lead of the subset of the plurality of leads. In a third example of the method, optionally including one or both of the first and second examples, determining the plurality of cluster labels for the plurality of clusters based on the plurality of conversion event records comprises: for a first cluster of the plurality of clusters: determining an average conversion rate of leads assigned to the first cluster, and setting a label of the first cluster based on the average conversion rate. In a fourth example of the method, optionally including one or more or each of the first through third examples the method further comprising: determining a mapping from a lead vector space to the plurality of cluster labels. In a fifth example of the method, optionally including one or more or each of the first through fourth examples, determining the mapping from the lead vector space to the plurality of cluster labels comprises: pairing a lead vector of the plurality of lead vectors with a cluster label of a cluster of which the lead vector is a member, to form a training data pair, and training a neural network to learn the mapping from the lead vector space to the plurality of cluster labels using the training data pair. In a sixth example of the method, optionally including one or more or each of the first through fifth examples the method further comprising: receiving a new lead comprising a plurality of lead attribute values, converting the plurality of lead attribute values to a plurality of benchmark values based on the plurality of conversion event records, encoding the new lead as a lead vector comprising the plurality of benchmark values, and assigning a cluster label to the new lead based on the lead vector. In a seventh example of the method, optionally including one or more or each of the first through sixth examples, assigning the cluster label to the new lead based on the lead vector comprises: mapping the lead vector to a cluster label using a learned mapping from a lead vector space to the plurality of cluster labels.

The disclosure also provides support for a method for a lead grading platform, the method comprising: receiving a lead from a lead vendor, wherein the lead comprises a plurality of lead attribute values, converting the plurality of lead attribute values to a plurality of benchmark values, assigning the lead to a pre-determined cluster and a pre-determined sub-cluster based on the plurality of benchmark values, determining a grade for the lead based on the pre-determined cluster and the pre-determined sub-cluster, and responding to the grade being greater than a threshold grade by: delivering the lead to a lead consumer. In a first example of the method, converting the plurality of lead attribute values to the plurality of benchmark values comprises: determining for a lead attribute value, V, a corresponding benchmark value, according to: wherein is given by: wherein is a number of conversions of leads with the lead attribute value, V, previously delivered to the lead consumer, and wherein is a number of leads with the lead attribute value, V, previously delivered to the lead consumer, and wherein is given by: wherein is a total number of leads previously delivered to the lead consumer, and wherein is a total number of conversions resulting from the total number of leads previously delivered to the lead consumer. In a second example of the method, optionally including the first example, assigning the lead to the pre-determined cluster and the pre-determined sub-cluster based on the plurality of benchmark values comprises: mapping the plurality of benchmark values to the pre-determined cluster and the pre-determined sub-cluster using a trained neural network. In a third example of the method, optionally including one or both of the first and second examples the method further comprising: responding to the grade being less than the threshold grade by: not delivering the lead to the lead consumer. In a fourth example of the method, optionally including one or more or each of the first through third examples, the plurality of lead attribute values comprise one or more of: personal contact information, lead source information, and product information. In a fifth example of the method, optionally including one or more or each of the first through fourth examples, the personal contact information includes one or more of: first name, last name, email address, phone number, mailing address, and residence address. In a sixth example of the method, optionally including one or more or each of the first through fifth examples, the lead source information includes one or more of: campaign, campaign tactic, and lead provider. In a seventh example of the method, optionally including one or more or each of the first through sixth examples, the product information includes one or more of: type of product, price of product, product name, and product characteristics.

The disclosure also provides support for a lead grading system, comprising: a processor, and non-transitory memory storing instructions, that when executed cause the processor to: receive a plurality of leads and a plurality of conversion event records for the plurality of leads, wherein each of the plurality of leads comprises a plurality of lead attribute values, convert the plurality of lead attribute values into a plurality of benchmark values based on the plurality of conversion event records, filter the plurality of benchmark values to produce a plurality of filtered benchmark values, encode the plurality of leads as a plurality of lead vectors comprising the plurality of filtered benchmark values, cluster the plurality of lead vectors to form a plurality of clusters, determine average conversion probabilities for each of the plurality of clusters, and grade the plurality of clusters based on the average conversion probabilities of each of the plurality of clusters. In a first example of the system, the processor is configured to filter the plurality of benchmark values by: determining an average benchmark value for a subset of the plurality of benchmark values corresponding to a first attribute, determining if the average benchmark value is within a pre-determined range, and responding to the average benchmark value being within the pre-determined range by: filtering out the subset of the plurality of benchmark values from the plurality of benchmark values. In a second example of the system, optionally including the first example, the processor is configured to filter the plurality of benchmark values by: determining a degree of correlation between a first subset of the plurality of benchmark values and a second subset of the plurality of benchmark values, wherein the first subset of the plurality of benchmark values corresponds to a first attribute, and wherein the second subset of the plurality of benchmark values corresponds to a second attribute, and responding to the degree of correlation being greater than a threshold by removing one of the first subset of the plurality of benchmark values or the second subset of the plurality of benchmark values. In a third example of the system, optionally including one or both of the first and second examples, the processor, when executing the instructions, is further configured to: map the plurality of lead vectors from a first lead vector space to a second lead vector space, wherein the second lead vector space is of lower dimension than the first lead vector space.

Aspects of the disclosure may operate on particularly created hardware, firmware, digital signal processors, or on a specially programmed computer including a processor operating according to programmed instructions. The terms controller or processor as used herein are intended to include microprocessors, microcomputers, Application Specific Integrated Circuits (ASICs), and dedicated hardware controllers.

One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a computer readable storage medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGAs, and the like.

Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or computer-readable storage media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the invention have been illustrated and described for purposes of illustration, it will be understood that various modifications may be made without departing from the spirit and scope of the invention. Accordingly, the invention should not be limited except as by the appended claims.

The invention claimed is:

1. A method comprising:
  receiving historical lead data, wherein the historical lead data comprises a plurality of leads and a plurality of conversion event records for the plurality of leads, and wherein each lead of the plurality of leads comprises a plurality of lead attribute values;
  converting the plurality of lead attribute values of each of the plurality of leads into a corresponding plurality of benchmark values based on the plurality of conversion event records;
    determining a first conversion rate for the plurality of leads based on the plurality of conversion event records;
    determining a second conversion rate for a subset of the plurality of leads based on the plurality of conversion event records, wherein the subset comprises leads of the plurality of leads with a first lead attribute value;
    determining a benchmark value by dividing the second conversion rate by the first conversion rate; and
    replacing the first lead attribute value by the benchmark value in each lead of the subset of the plurality of leads;
  encoding the plurality of leads into a plurality of lead vectors;
  clustering the plurality of lead vectors to form a plurality of clusters;
  determining a plurality of cluster labels for the plurality of clusters based on the plurality of conversion event records; and
  determining a mapping from a lead vector space to the plurality of cluster labels by:
    pairing a lead vector of the plurality of lead vectors with a cluster label of a cluster of which the lead vector is a member, to form a training data pair; and
    training a neural network to learn the mapping from the lead vector space to the plurality of cluster labels using the training data pair.

2. The method of claim 1, the method further comprising:
  identifying sub-clusters in each of the plurality of clusters to form a plurality of sub-clusters; and
  determining a plurality of sub-cluster labels for the plurality of sub-clusters based on the plurality of conversion event records.

3. The method of claim 1, wherein determining the plurality of cluster labels for the plurality of clusters based on the plurality of conversion event records comprises:
  for a first cluster of the plurality of clusters:
    determining an average conversion rate of leads assigned to the first cluster; and
    setting a label of the first cluster based on the average conversion rate.

4. The method of claim 1, the method further comprising:
  receiving a new lead comprising a plurality of lead attribute values;
  converting the plurality of lead attribute values to a plurality of benchmark values based on the plurality of conversion event records;
  encoding the new lead as a lead vector comprising the plurality of benchmark values; and
  assigning a cluster label to the new lead based on the lead vector.

5. The method of claim 4, wherein assigning the cluster label to the new lead based on the lead vector comprises:
  mapping the lead vector to a cluster label using a learned mapping from a lead vector space to the plurality of cluster labels.

* * * * *